(12) United States Patent
Vakhtin et al.

(10) Patent No.: US 7,394,546 B2
(45) Date of Patent: Jul. 1, 2008

(54) METHOD AND APPARATUS FOR FULL PHASE INTERFEROMETRY

(75) Inventors: Andrei B. Vakhtin, Los Alamos, NM (US); Daniel J. Kane, Santa Fe, NM (US); Kristen A. Peterson, Santa Fe, NM (US)

(73) Assignee: Southwest Sciences Incorporated, Santa Fe, NM (US)

( * ) Notice: Subject to any disclaimer, the term of this patent is extended or adjusted under 35 U.S.C. 154(b) by 101 days.

(21) Appl. No.: 11/438,864

(22) Filed: May 22, 2006

(65) Prior Publication Data

US 2006/0290939 A1    Dec. 28, 2006

Related U.S. Application Data

(60) Provisional application No. 60/683,920, filed on May 23, 2005, provisional application No. 60/784,574, filed on Mar. 21, 2006.

(51) Int. Cl.
*G01B 9/02* (2006.01)
*G01J 3/45* (2006.01)

(52) U.S. Cl. .................................................. 356/456
(58) Field of Classification Search ................. 356/451, 356/452, 453, 454, 455, 456, 479, 497
See application file for complete search history.

(56) References Cited

U.S. PATENT DOCUMENTS

| | | | |
|---|---|---|---|
| 5,166,749 A | 11/1992 | Curbelo et al. | |
| 5,321,501 A | 6/1994 | Swanson et al. | |
| 5,459,570 A | 10/1995 | Swanson et al. | |
| 5,539,518 A | 7/1996 | Bennett | |
| 5,565,986 A | 10/1996 | Knuttel | |
| 5,877,856 A | 3/1999 | Fercher | |
| 6,134,003 A | 10/2000 | Tearney et al. | |
| 6,351,307 B1 | 2/2002 | Erskine | |
| 6,377,349 B1 | 4/2002 | Fercher | |
| 6,421,164 B2 | 7/2002 | Tearney et al. | |
| 7,079,254 B2 | 7/2006 | Kane et al. | |

OTHER PUBLICATIONS

Choma, Michael A., et al., "Instantaneous quadrature low-coherence interferometry with 3×3 fiber-optic couplers", *Optics Letters*, vol. 28, No. 22, Optical Society of America,(Nov. 15, 2003),2162-2164.

Choma, Michael A., et al., "Sensitivity advantage of swept source and Fourier domain optical coherence tomography", *Optics Express*, vol. 11, No. 18,(Sep. 8, 2003),2183-2189.

(Continued)

*Primary Examiner*—Michael A Lyons
(74) *Attorney, Agent, or Firm*—Jeffrey D. Myers; Peacock Myers, P.C.

(57) ABSTRACT

An apparatus and method for differential spectral interferometry comprising providing an interferometer comprising a light source; employing an element to provide a dithered relative phase shift between target and reference arms of the interferometer, detecting output from the interferometer, demodulating signals received from the detector at different multiples of the dither frequencies, generating more than one real-valued interferograms from demodulated signals, and using the real-valued interferograms to obtain the complex spectral interferogram.

26 Claims, 11 Drawing Sheets

OTHER PUBLICATIONS

De Boer, Johannes F., et al., "Improved signal-to-noise ratio in spectral-domain compared with time-domain optical coherence tomography", *Optics Letters*, vol. 28, No. 21, Optical Society of America,(Nov. 1, 2003),2067-2069.

Fercher, Adolph F., et al., "Measurement of Introocular Distances by Backscattering Spectral Interferometry", *Optics Communications*, vol. 117, (May 15, 1995),43-48.

Hausler, Gerd, et al., ""Coherence Radar" and Spectral Radar"—New Tools for Dermatological Diagnosis, *Journal of Biomedical Optics*, vol. 3, No. 1, (Jan. 1998),21-31.

Leitgeb, Rainer A., et al., "Performance of Fourier Domain vs. Time Domain Optical Coherence Tomography", *Optics Express*, vol. 11, No. 8, (Apr. 21, 2003),889-894.

Leitgeb, Rainer A., et al., "Phase-Shifting Algorithm to Achieve High-Speed Long-Depth-Range Probing by Frequency-Domain Optical Coherence Tomography", *Optics Letters*, vol. 28, No. 22, (Nov. 15, 2003),2201-2203.

Morgner, U., et al., "Spectroscopic optical coherence tomography", *Optics Letters*, vol. 25, No. 2, Optical Society of America,(Jan. 15, 2000),111-113.

Pennwell Corporation, "Differential Spectral Interferometry May Boost Dynamic Range of OCT", *OptoElectronics World New, Laser Focus World*, (Jan. 2004).

Sarunic, Marinko V., et al., "Instantaneous complex conjugate resolved spectral domain and swept-source OCT using 3×3 fiber couplers", *Optics Express*, vol. 13, No. 3,(Feb. 7, 2005),957-967.

Schmit, Joanna, et al., "Extended Averaging Technique for Derivation of Error-Compensating Algorithms in Phase-Shifting Interferometry", *Applied Optics*, vol. 34, No. 19, (Jul. 1, 1955),3610-3619.

Vakhtin, Andrei B., et al., "Common-Path Interferometer for Frequency-Domain Optical Coherence Tomography", *Applied Optics*, vol. 42, No. 34, Inventors' published paper,(Dec. 1, 2003),6953-6958.

Vakhtin, Andrei B., et al., "Differential Spectral Interferometry: An Imaging Technique for Biomedical Applications", *Optics Letters*, vol. 28, No. 15, Inventors' published paper,(Aug. 1, 2003),1332-1334.

Vakhtin, Andrei B., et al., "Resolving the complex conjugate ambiguity in Fourier-domain OCT by harmonic lock-in detection of the spectral interferogram", *Optics Letters*, vol. 31, No. 9, Optical Society of America,(May 1, 2006),1271-1273.

Van Staveren, Hugo J., et al., "Light Scattering in Intralipid—10% in the Wavelength Range of 400-1100 nm", *Applied Optics*, vol. 30, No. 31, (Nov. 1, 1991),4507-4514.

Wilson, G. V., "Modulation Broadening of NMR and ESR Line Shapes", *Journal of Applied Physics*, vol. 34, No. 11,(Nov. 1963),3276-3285.

Wojtkowski, Maciej, et al., "Full Range Complex Spectral Optical Coherence Tomography Technique in Eye Imaging", *Optics Letters*, vol. 27, No. 15, (Aug. 15, 2002),1415-1417.

Wojtkowski, Maciej, et al., "In Vivo Human Retinal Imaging by Fourier Domain Optical Coherence Tomography", *Journal of Biomedical Optics*, vol. 7, No. 3, (Jul. 2002),457-463.

Zhang, Jun, et al., "Removal of a mirror image and enhancement of the signal-to-noise ratio in Fourier-domain optical coherence tomography using an electro-optic phase modulator", *Optics Letters*, vol. 30, No. 2, Optical Society of America,(Jan. 15, 2005),147-149.

US 7,394,546 B2

METHOD AND APPARATUS FOR FULL PHASE INTERFEROMETRY

CROSS-REFERENCE TO RELATED APPLICATIONS

This application claims priority to and the benefit of the filing of U.S. Provisional Patent Application Ser. No. 60/784,574, entitled "Method and Apparatus for Full Phase Interferometry", filed on Mar. 21, 2006, and of U.S. Provisional Patent Application Ser. No. 60/683,920, entitled "Method and Apparatus for Full Phase Interferometry", filed on May 23, 2005, and the specifications and claims thereof are incorporated herein by reference.

The present application is related to, but does not claim priority to, U.S. patent application Ser. No. 10/804,804, entitled "Method and Apparatus for Imaging Internal Structures of Transparent and Translucent Materials", published on Dec. 2, 2004 as U.S. Patent Application Publication No. 2004/0239946, and the specification and claims thereof are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DMI-0214911 awarded by the U.S. National Science Foundation.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to the field of full phase interferometry wherein the phase of the interferogram is recovered from only intensity measurements. Applications of the invention include phase-shifting interferometry, Fourier domain optical coherence tomography, and Fourier domain optical coherence reflectometry.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

The ability to perform high resolution, subsurface imaging is needed in many fields including biology and medicine (tissue structure and pathology, cell morphology, tumor detection), materials science (composite, ceramic and microstructured materials characterization), and semiconductor device characterization. Application of optical techniques to biological materials is especially difficult because of the absorption and scattering characteristics of tissues. Several optical techniques that provide micrometer scale or better resolution have been applied to biological and medical imaging and each has different strengths and weaknesses. These techniques include confocal and two-photon fluorescence microscopy, confocal Raman spectroscopy, near-field optical microscopy, and optical coherence tomography (OCT), which is a term used for optical coherence reflectometry (OCR) when applied to biomedical imaging. Methods based on fluorescence or Raman scattering can provide high resolution and chemical specificity, but are not as useful for high resolution subsurface imaging because of absorption of either the input or signal wavelengths. On the other hand, OCT and other reflectometry techniques, such as spectral interferometry (SI), can provide structural information in scattering media at depths up to a few millimeters with a spatial resolution of a few micrometers. Imaging through centimeters of tissue can also be performed with reflectometry methods, but with much lower resolution. Since such methods detect reflective or back-scattering sites, they generally do not provide chemical identification. However, they are very useful for elucidating structure in heterogeneous or layered materials—such as skin tissue, for example. Furthermore, techniques like OCT and SI do not require fluorescence tagging, staining, or fixing of the sample.

The present invention is related to a rapid, high resolution optical imaging method and apparatus for, among other applications, clinical and biomedical research problems including studies of tissue response to drugs or radiation exposure, detection of cancerous and precancerous tissues, imaging of venous and arterial structures, and imaging of ocular pathologies. The method and apparatus, which will be referred to as complex differential spectral interferometry (CDSI), is based on the technique called differential spectral interferometry (DSI) described in U.S. Patent Application Publication No. 2004/0239946. The invention significantly improves the performance of DSI by allowing instantaneous acquisition of the full complex spectral interferogram and better resolving of the complex conjugate ambiguity, the major artifact problem of the DSI method. The CDSI method and apparatus can be easily used with fiber optics and can be incorporated into endoscopes, catheters and similar devices for in vivo applications.

Both CDSI and DSI are extensions of spectral interferometry (SI), a low coherence scattering technique, which performs measurements in Fourier domain (or frequency domain), as opposed to time-domain OCT (TD-OCT), which performs measurements in time domain. SI and TD-OCT are Fourier transform analogs. "Spectral interferometry" is also known as "Fourier domain Optical Coherence Tomography," "frequency domain Optical Coherence Tomography," "spectral domain Optical Coherence Tomography," and "Spectral radar." Both SI and TD-OCT have potential for imaging in tissue. Recent work has postulated that SI or Fourier domain OCT (FD-OCT) has the potential to have a large sensitivity advantage over conventional TD-OCT systems. Leitgib et al., Opt. Express 11, p. 889 (2003); Choma et al., Opt. Express 11, p. 2183 (2003); and de Boer et al., Opt. Lett. 28, p. 2067 (2003). However, this work also admits that the improvement in sensitivity is difficult to implement in practice. There are three reasons for the low sensitivity of conventional SI as compared to TD-OCT. First, SI is a DC measurement that causes large amounts of DC and 1/f noise to be integrated into the measured signal. Second, SI has background artifacts (so called autocorrelation terms) that cannot be removed by averaging. Third, SI images obtained from real-valued spectral interferograms suffer form the complex conjugate ambiguity (also known as reflection ambiguity or reflected image ambiguity), an artifact that is inherent to real Fourier transform.

Because of this artifact, an SI image obtained from a real-valued interferogram consists of two overlapped images that are symmetrical with respect to the zero phase delay of the interferometer. To avoid ambiguity in interpretation of the image, the zero phase delay plane must be positioned outside of the imaged sample. Thus only one half of the imaging depth range is useful in practice.

An example of the "complex conjugate ambiguity" or "reflected image ambiguity" is shown schematically in FIG. 2. The figure depicts light being scattered from two surfaces of a thick, non-scattering object (glass plate, for example). The "center point" corresponding to zero phase delay of the interferometer is the center of the scan. In the case of TD-OCT, there is no reflection ambiguity about the center of the scan. In other words, the position of all scattering points relative to each other is preserved. In the case of SI, however, there appears to be two points on each side of the center scan. Worse, SI has a large DC background that is difficult to remove; it is a DC measurement with a large 1/f noise component. (The 1/f noise component can also contain sample movement and vibration-all low frequency noise sources.)

To remove the DC and autocorrelation artifacts, Applicants developed the DSI technique. Vakhtin et al., Opt. Lett. 28, p. 1332 (2003). DSI removes the DC component in SI measurements because lock-in or differential detection, phase-locked to a dither in the reference arm, passes detection frequencies only around the dither frequency. All frequencies at DC are removed where the majority of 1/f noise resides. (It should be noted, however, that the detection bandwidth can be quite small even though the detection frequency can be large.) The autocorrelation artifacts are also removed. Thus, DSI allows the greater dynamic range and sensitivity inherent in SI detection to be realized. DSI has additional advantages over conventional TD-OCT that result in a robust instrument suitable for research and clinical settings. These advantages include faster imaging rates and the simplification of the interferometer. However, the basic, single modulation version of DSI does not remove the complex conjugate artifact.

The problem of complex conjugate ambiguity has been addressed using different approaches, including phase-shifting methods, simultaneous detection of the quadrature components of the interferogram by using 3×3 fiber-optic couplers, and separation of the two complex conjugate images by choosing the appropriate carrier frequency in swept-source FD-OCT.

Phase-shifting methods allow acquisition of the complex spectral interferogram to be obtained in a multi-frame sequence. Schmitt and Creath, Appl. Opt. 34, p. 3610 (1995); and Wojtkowski et al., Opt. Lett 27, p. 1415 (2002). A multiple-phase-shift extension of DSI resolves the complex conjugate ambiguity. However, in practice the complex conjugate rejection ratio is limited by accuracy of the phase steps and also by the mechanical stability of the interferometer and the sample during the acquisition time of the frame sequence. Phase-shifting methods are sequential in nature and cannot provide simultaneous acquisition of the quadrature components of the complex spectral interferogram.

The detection of the complex interferogram using 3×3 fiber couplers as phase-shifting elements allows simultaneous detection of the real and imaginary components of the spectral interferogram. Choma et al., Opt. Left. 28, p. 2162 (2003); and Sarunic et al., Opt. Express 13, p. 957 (2005). This requires two separate detectors for acquiring the quadrature components. Slight misalignments in matching the spectrometers (in the case of broadband FD-OCT) and uneven wavelength-dependent splitting ratios in the coupler that lead to imperfect subtraction of the spectra (in the case of swept source FT-OCT) limit the suppression of the complex conjugate artifacts. The reported maximum complex conjugate rejection ratio is 20 dB for broadband FD-OCT and 25 dB for swept source FD-OCT. Sarunic et al., Opt. Express 13, p. 957 (2005).

Choosing the appropriate carrier frequency in swept-source FD-OCT separates the two mirror images and resolves the complex conjugate ambiguity. Zhang et al., Opt. Lett. 30, p. 147 (2005). However, this is not applicable to the parallel implementation of FD-OCT (which involves a broadband light source and detection of the spectral interferograms with an array detector). Also, when the full complex interferogram is not obtained, spectral information is lost.

The present invention, CDSI, improves DSI to better recover complex interferograms and resolve the complex conjugate ambiguity. Compared to other methods of full phase interferometry, the present invention provides a better complex conjugate rejection ratio and allows simultaneous acquisition of the quadrature components of the complex spectral interferogram.

The present CDSI invention has several important advantages over the current state of DSI including more accurate and instantaneous measurement of the complete complex interferogram with higher dynamic range than is possible using TD-OCT methods and possibility of combining spectral and structural imaging into one device. CDSI provides the potential for combining spectral and structure data. While some work has demonstrated that SI can provide some spectral information together with structural information, the best results have indicated that the full complex interferogram is required. Indeed, mathematically this is the case. Work with ultrashort laser pulse measurement (reconstruction of the pulse from spectrograms) indicates that full interferograms will be required to combine spectral and structural information in TD-OCT systems. Thus, only TD-OCT with complete digitization of the interferogram can provide both spectral and structural information together. Normally TD-OCT uses envelope detection which does not record much of the information required to obtain both spectral and structure information. Attempts to record the entire interferogram significantly reduce the dynamic range of the TD-OCT device. Morgner et al., Opt. Lett. 25, p. 111 (2000). In contrast, CDSI recovers the full complex interferogram, which provides the potential of combining both structural and spectroscopic imaging into one device without losing the dynamic range.

BRIEF SUMMARY OF THE INVENTION

The present invention is of an apparatus and corresponding method for differential spectral interferometry, comprising: providing an interferometer comprising a light source; employing an element to provide a dithered, continuous relative phase shift between target and reference arms of the interferometer; detecting output from the interferometer; demodulating signals received from the detector using at least two demodulators operating at different multiples of the dither frequency; and generating one or more differential spectral interferograms from signals from the demodulators at. In the preferred embodiment, detecting employs a wavelength-selective device, the light source is wavelength-tunable, and the light source is spectrally broadband. Alternatively, wavelength selection can be done using a wavelength tunable source. One of the demodulators preferably operates at the dither frequency and another at twice the dither frequency (or an even multiple of the dither frequency greater than two). Alternatively, one of the demodulators operates at an even multiple of the dither frequency and another at an odd multiple of the dither frequency. Signals from two of the demodulators separately represent real and imaginary components of a complex spectral interferogram and the real and imaginary components of the complex spectral interferogram are used to obtain the complex spectral interferogram. The dither frequency can differ for two (or more) of the demodulators.

The present invention is also of an apparatus and corresponding method for differential spectral interferometry, comprising: providing an interferometer comprising a light source; employing at least one element to provide a modulated relative phase shift between target and reference arms of the interferometer; detecting output from the interferometer with al least one detector; demodulating signals received from the at least one detector using at least two demodulators operating at different multiples of the modulation frequency; and generating a spectral interferogram from each demodulator.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method and apparatus that can be used for depth-resolved optical imaging of multiple back-scattering and back-reflecting sites in translucent samples or can be used for interferometry to obtain the full complex interferogram from only intensity measurements. The method resolves the following issues inherent to spectral interferometry or Fourier-domain optical coherence tomography (FD-OCT), also known as "spectral-domain OCT", "frequency-domain OCT", "swept-source spectral OCT", "swept-source OCT", "differential spectral interferometry", "spectral radar": (1) the complex conjugate ambiguity is removed to at least 45 dB; (2) the DC and autocorrelation background terms are suppressed; and (3) the quadrature components (real and imaginary parts) of the full complex spectral interferogram are obtained simultaneously using the same detector for any given wavelength (optical frequency). The method is referred as Complex Differential Spectral Interferometry (CDSI) and is generally described in the Applicants' paper Vakhtin et al., Opt Lett. 31, p. 1271 (2006).

Resolving the complex conjugate ambiguity in SI (or FD-OCT) is a great advantage of this invention.

Figure 1:
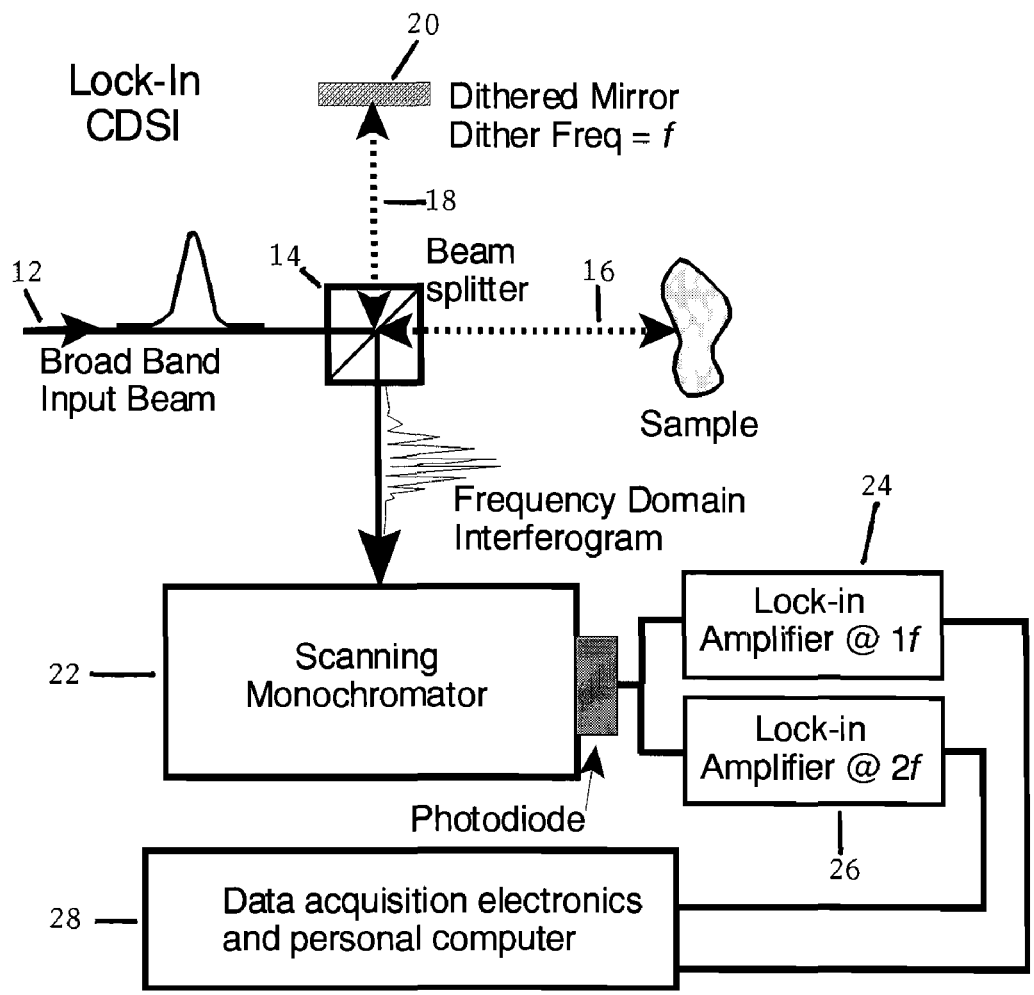
FIG. 1 is schematic diagram of the preferred lock-in based CDSI system according to the invention—the interferogram is phase modulated by the dithered mirror at a frequency of f; the resulting spectral (or frequency domain) interferogram is sent into a scanning monochromator; the output is detected using an amplified photodiode and demodulated simultaneously at 1 f and 2 f using two lock-in amplifiers.
Figure 2:
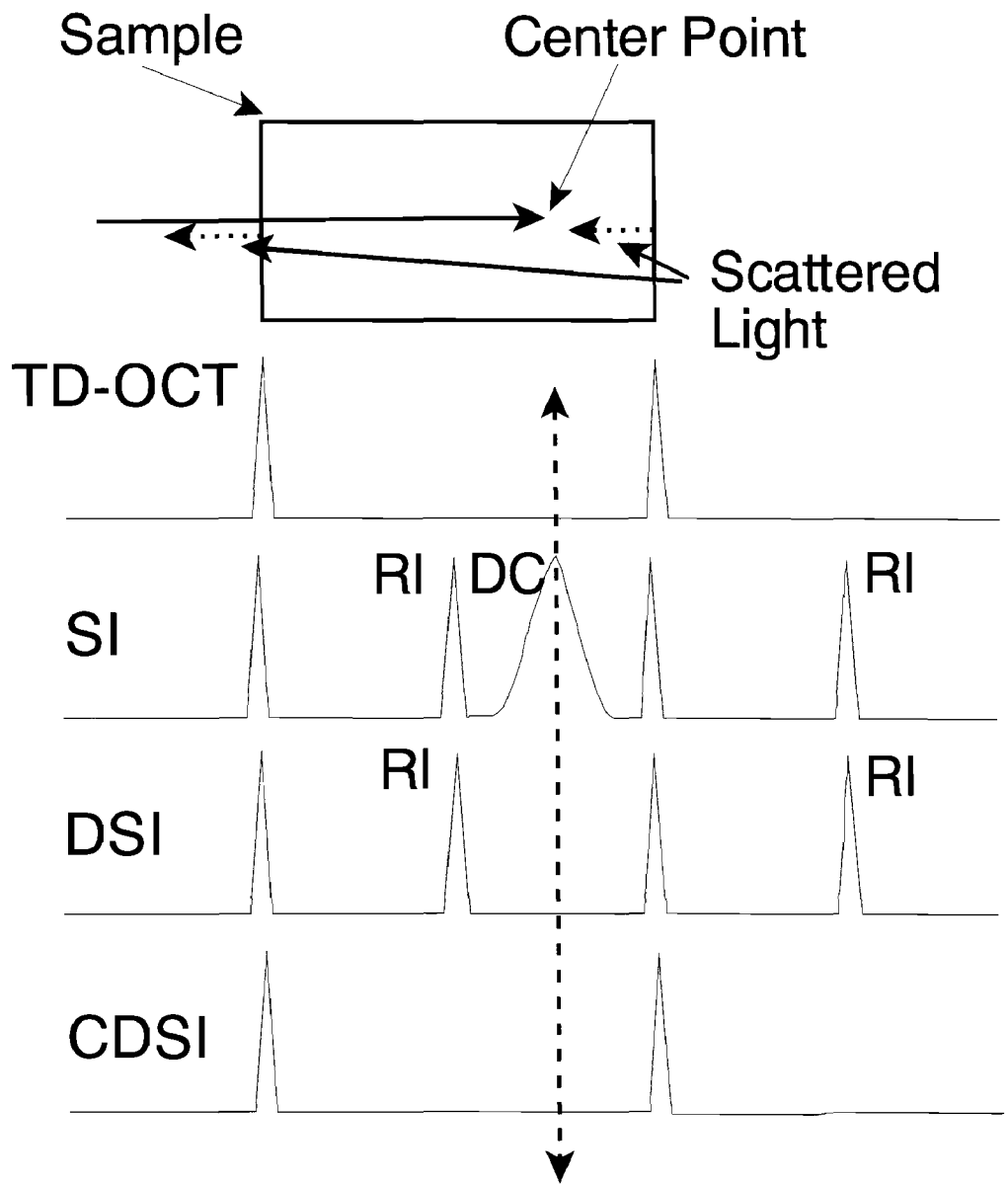
FIG. 2 shows schematically the effect of the reflection ambiguity of the prior art when imaging a simple object—light enters the object from the left and is scattered from the object boundaries—CDSI resolves the reflected image ambiguity inherent in SI and DSI (RI—Reflected Image; DC—DC background)—center point corresponds to zero phase delay of the interferometer.

Referring to FIG. 1, light 12 from a light source is directed into a beam splitter 14 where the light beam is split into two or more beams. One beam is sent to a sample 16, and another is sent to a reference arm 18. The sample and reference beams can be physically separated, or they can overlap (for example, in a common path interferometer. Vakhtin et al., Appl. Opt. 42, p. 6953 (2003). In either the reference arm or the sample arm or both is a means 20 to phase modulate the light.

The most straightforward way to dither the phase of the light is to use a periodic phase modulation (sine, rectangular, triangular, sawtooth, etc.). Since the main purpose of the modulation is to produce detectable signals at multiple harmonics, more complicated phase modulation waveforms can also be used. The use of pre-calculated and pre-stored waveforms is also possible. A variety of devices can be used to phase modulate (or dither the phase of) the light, such as: (1) piezo or other translators or actuators to achieve mechanical movements of an optical element of the interferometer (including the sample) that lead to phase modulation; (2) periodic electric or magnetic fields or acoustic waves to achieve a periodic changes in properties of an optical element of the interferometer (including the sample) that lead to phase modulation; (3) electro-optical devices or acousto-optic devices (acousto-optical modulator (AOM), electro-optical modulator (EOM), frequency shifter, etc ); and (4) modulating the frequency of the light to provide a phase shift, either inside the interferometer, or external to the interferometer. Accordingly, any method that phase modulates light can be used.

Light reflected from the sample is combined with light reflected from the reference arm to produce the interference fringe pattern interferogram and sent into a detector 22. The detector signal is demodulated 24,26 at a plurality of harmonics, preferably both the first and second harmonics and possibly higher harmonics of the phase modulation frequency. The demodulated signals are collected and processed via data processor 28 (e.g., a personal computer)

The light can be spectrally dispersed before it is detected and the detector signal is demodulated. The light source can be swept in wavelength. A demodulating detector array or a single element detector can be used. Simultaneous demodulation of the detector signal at multiple harmonics is possible. Demodulation can be performed using an analog or digital device. For example, a CCD may be used to digitally sample the output of the interferometer over a range of wavelengths. The resulting output can then be digitally demodulated and filtered to obtain the desired harmonics.

The first and the second harmonics represent the quadrature components (the real and imaginary parts) of the complex spectral interferograms. The spectral interferogram at the output of the interferometer under stationary conditions (no phase modulation) can be expressed as follows:

$$I_{SI}(\omega, \phi(\omega)) = I_R(\omega) + 2\sqrt{I_R(\omega)I_S(\omega)} \times \cos(\phi_S(\omega) - \phi_R(\omega) - \phi(\omega)) \quad (1)$$

where $\omega$ is the frequency of the electromagnetic wave; $I_{SI}(\omega,\phi))$ is the frequency- and phase-dependent spectral interferogram; $\phi(\omega)$ is a fixed frequency-dependent phase delay at the output of the interferometer; $I_R(\omega)$ and $\phi_R(\omega)$, and $I_S(\omega)$ and $\phi_S(\omega)$ are the light intensities and phases in the reference and the sample arms of the interferometer, respectively. When a harmonic phase modulation is applied, the phase delay $\phi(\omega)$ becomes time dependent:

$$\phi(\omega) = \phi_0(\omega) + a_m \sin \omega_m t \quad (2)$$

Here t is the time, $\omega_m = 2\pi f$ is the phase modulation frequency, and $a_m$ is the modulation amplitude. Generally, the modulation amplitude $a_m$ is wavelength dependent. For example, if the phase modulation is achieved by dithering the reference mirror, $a_m$ scales linearly with the optical frequency $\omega$, which can easily be taken into account in signal processing. Thus it will be written as $a_m(\omega)$.

Calculating the Fourier components of the signal in Eq. 1 one can express the signals demodulated at the first ($H_1$) and second ($H_2$) harmonic as follows [Hanna and Rowland, Fourier Series, Transforms, and Boundary Value Problems (Wiley, 1990)]:

$$H_1(\omega, \phi_0(\omega)) = 4J_1(a_m(\omega)) \sqrt{I_R(\omega)I_S(\omega)} \times \sin(\phi_S(\omega) - \phi_R(\omega) - \phi_0(\omega)) \quad (3)$$

$$H_2(\omega, \phi_0(\omega)) = -4J_2(a_m(\omega)) \sqrt{I_R(\omega)I_S(\omega)} \times \cos(\phi_S(\phi_S(\omega) - (\omega) - \phi_0(\omega)) \quad (4)$$

where $J_1$ and $J_2$ are the first- and second-order Bessel functions, respectively. Equations (3) and (4) represent the imaginary and the real components of the complex spectral interferogram, respectively. The complex inverse Fourier transform can be applied to the complex spectral interferogram to convert it into the time domain profile that is free from the complex conjugate ambiguity, and also the DC and autocorrelation terms:

$$f(\tau) = \mathfrak{I}^{-1}(-\beta H_2(\omega,\phi_0(\omega)) + iH_1(\omega, \phi_0(\omega)) \quad (5)$$

According to Eqs. 3 and 4, the scaling coefficient $\beta$ equals to:

$$\beta = J_1(a_m(\omega))/J_2(a_m(\omega)), \quad (6)$$

and depends only on the modulation amplitude and, generally, on the optical frequency (as discussed above).

Implementation of the invention for swept-source FD-OCT is straightforward; the phase being modulated at each wavelength step. For the broadband light source/detector array version, a demodulating detector array is required. The phase modulation amplitude $a_m(\omega)$ does not need to be known precisely. For arbitrary modulation amplitude, the scaling coefficient $\beta$ can be considered an adjustable parameter and be chosen so that the complex conjugate rejection ratio is maximized. The scaling coefficient $\beta$ can be experimentally determined using the ratio of the signals demodulated at the first- and third-harmonics.

Any pair of odd/even harmonics can be used for obtaining the quadrature components of the full complex interferogram. The scaling coefficient will be the ratio of the Bessel functions of the corresponding orders. For an arbitrary phase modulation amplitude $a_m(\omega)$, the right choice of the demodulation harmonics can help avoiding the zeros of the Bessel functions, which can lead to poor complex conjugate rejection ratio and signal-to-noise ratio. More than two harmonics (at least one of which must be odd and at least one of which must be even) can be used for obtaining the quadrature components of the full complex interferogram to enhance the complex conjugate rejection ratio and the signal-to-noise ratio. Any pair of odd/odd or even/even harmonics can be used for determining the phase modulation amplitude $a_m(\omega)$, and more than two harmonics (all odd or all even) can be used for determining the phase modulation amplitude $a_m(\omega)$ to enhance the accuracy of the determination.

Multiple modulation frequencies can be used as well. For example, phase modulation could be done at 1.0 MHz and 550 kHz, and detection at 1.0 MHz (first harmonic) and 1.1 MHz (second harmonic). This can help to optimize detection circuitry. In other words, the frequency response of the detection circuitry does not have to span an octave to measure the first and second harmonics. Also, with digital signal processing, it is possible to detect harmonics of random phase modulations.

Using multiple modulation frequencies allows using a single demodulator to obtain the real and imaginary components of the complex spectral interferogram. For example, if the optical phase is modulated at f and 2 f, the modulation phases can be adjusted so that demodulation at 2 f with a single demodulator generates the real and imaginary components of the complex spectral interferogram as in-phase and quadrature signals.

There are several advantages to this approach. First, the phase modulation amplitude does not need to be known precisely as in the phase stepping method. Second, the phase modulation can occur at speeds that are fast enough to mitigate motion and vibration artifacts. Third, this method provides better rejection of the reflection ambiguity than is possible using phase stepping.

To fully take advantage of the present invention, full parallel data acquisition for CDSI is preferred. Accordingly, it is preferred to have lock-in detection for each channel/detector on the photodiode array. That is, the output from each photodiode is preferably amplified by a transimpedance amplifier. The output from the transimpedance amplifier is then AC coupled to a conditioning amplifier before it is digitized by a high-quality analog-to-digital convertor. The output stream from the A/D is then sent to a field programmable gate array (FPGA) or other programmable logic device for preprocessing and buffering before being transferred to a computer via a digital frame grabber. The FPGA is preferably programmed for simultaneous multiple harmonic demodulation (first and second harmonics).

INDUSTRIAL APPLICABILITY

The invention is not only useful in bio-medical and material science imaging applications, but also in Fourier domain optical coherence reflectometry for fiber optics inspection and long-distance ranging, phase-shifting interferometry, phase-shifting holography, and coherent detection interferometry. The demodulating detector array can be used in time-domain OCT for simultaneous full-field imaging, The invention is further illustrated by the following non-limiting examples.

EXAMPLE 1

In the following experiments, Applicants applied both the phase-shifting method and the present invention (CDSI, or the harmonic detection method) to simple Fourier domain OCT experiments and compare the results. In this comparison, it was found that the phase shifting method can provide only 40 dB of rejection of the complex conjugate while the harmonic detection method provided at least 45 dB of rejection, which was noise limited. The overall conclusions were that the harmonic detection method was superior.

Figure 3:
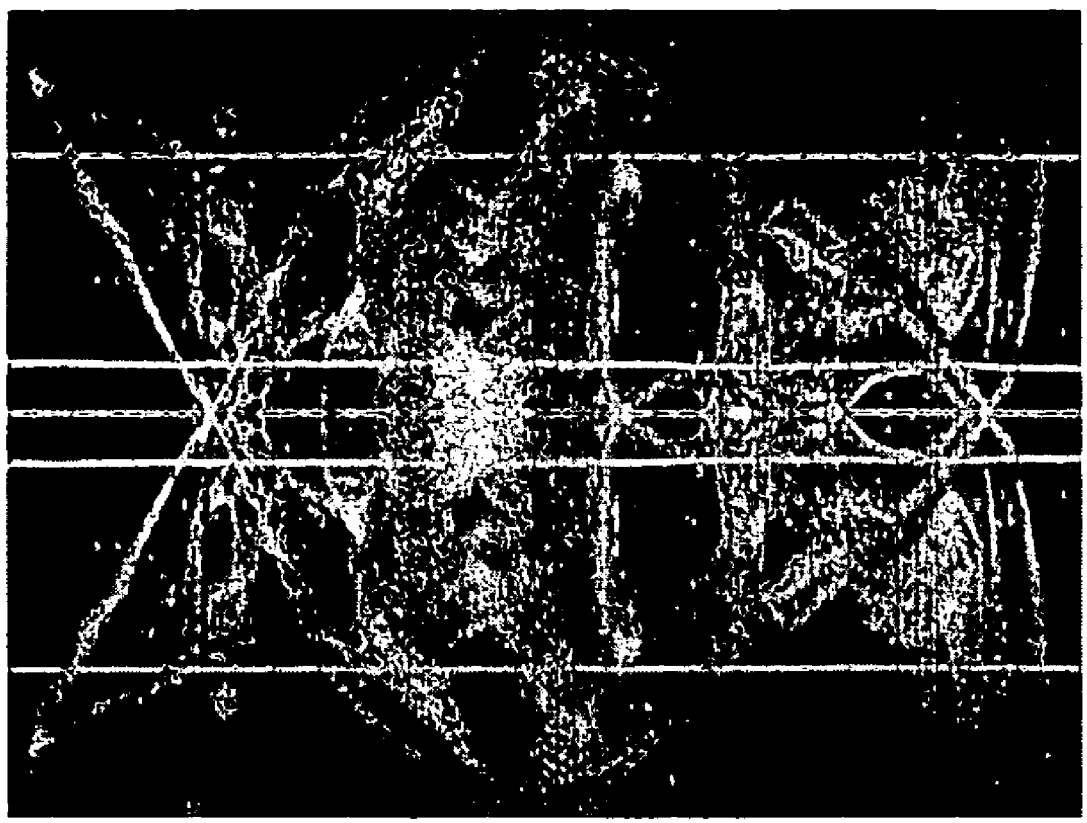
FIG. 3 is a prior art two-frame DSI image of the head of a Xenopus Laevis tadpole, with reflection ambiguities complicating the image.
Figure 4:
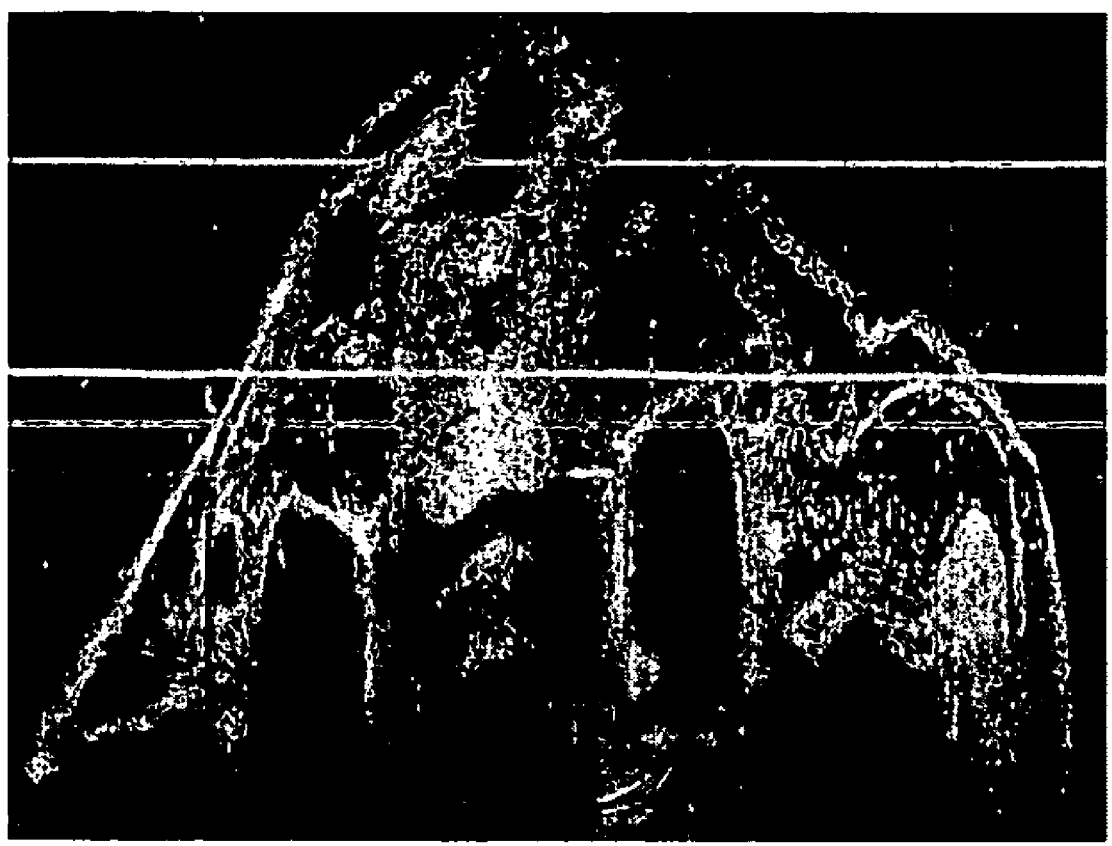
FIG. 4 is a prior art image of the same region as in FIG. 3 obtained using a 5-frame phase shifting method to obtain the complex spectral interferogram. The DC and complex conjugate artifacts are removed partially. Structures such as the ear cavities and brain are clearly visible. The DC artifact shows up as the horizontal line passing through the center of the image. The reflected (complex conjugate) images are also visible. The complex conjugate rejection ratio is less that 40 dB. The other horizontal lines are ghost images of the cover slip used to hold the tadpole.

Shown in FIGS. 3 and 4 are prior art two-dimensional images (B-scans) of the head region (~3 mm wide by ~2 mm deep) of a Xenopus Laevis tadpole using both straight differential spectral interferometry (DSI) and a five-frame 5A phase stepping procedure, respectively. Both are an average of 10 A-scans. The images are displayed on a log scale. The reflection ambiguity is clearly well rejected in FIG. 4. The center horizontal line is the DC artifact. The other horizontal lines are ghost images of the cover slip used to hold the sample. In most applications, a cover slip would not be required. All-in-all, the images are comparable to previously obtained DSI images in terms of both signal-to-noise ratio and contrast. Although the 5A phase stepping procedure suppresses the DC and reflection ambiguity artifacts, they are still visible in the image.

Next the present invention (CDSI) was used that was superior to a phase stepping method and was more compatible with lock-in detection. Applicants were able to achieve noise limited rejection of the complex conjugate ambiguity. While standard phase stepping methods can be used to remove the complex conjugate ambiguity, they are time consuming, requiring several frames to be obtained (at least 2 differential A-scans). Furthermore, the reflection ambiguity rejection is limited by the phase stability of the interferometer, and, thus indirectly by the speed of the data acquisition as well as the accuracy of the phase modulation.

A schematic diagram of the experimental setup used to implement the present invention (CDSI) is shown in FIG. 1. An amplified photodiode is set at the output of a scanning monochromator. The output from the photodetector is sent to two lock-in detectors. The first demodulates the signal at the first harmonic of the phase dither frequency and the second demodulates the signal at the second harmonic. As the monochromator is scanned in wavelength, the output from the 1 f demodulation is the imaginary part of the interferogram and the output from the 2 f demodulation is the real part of the interferogram. According to our derivation, the phase for the demodulation should be the same for both harmonics. In practice, we found that the second harmonic was phase shifted by nearly 75 degrees. Applicants expect that this occurs because of the amplifier for the photodiode.

Figure 5:
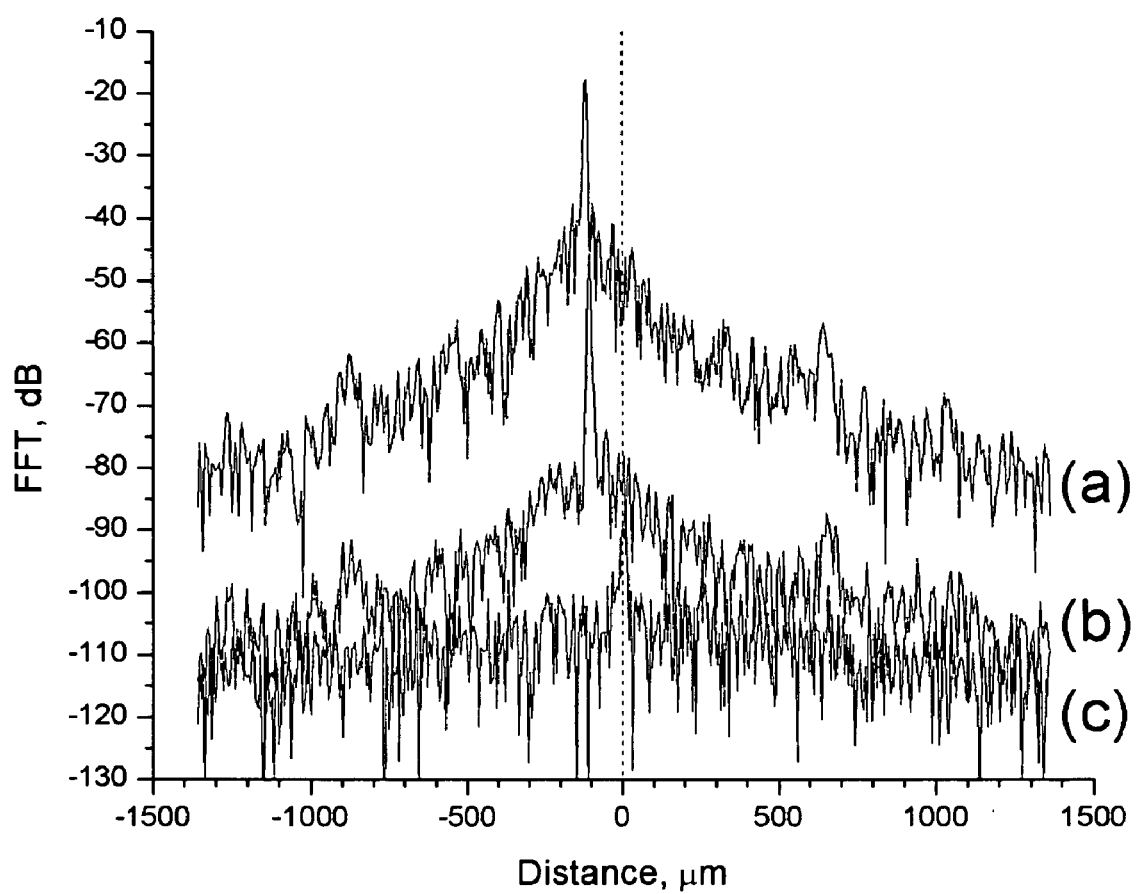
FIG. 5 is a CDSI scan of a mirror using the present invention. Scan (a) is obtained using an unattenuated reflection from the surface of the mirror. In scan (b), a 14 dB attenuator was placed in the sample path between the sample and the beam splitter. In scan (c), the sample arm was completely blocked. The DC and complex conjugate artifacts are suppressed down to the noise level. The dotted line indicates the zero phase delay plane. The complex conjugate rejection ratio is about 45 dB. The wings around the peak are due to phase noise in the scan because of the length of time required to obtain the data using a scanning monochromator, not reflection ambiguities. The sidebands at −1240, −890, 650, 1000 um are artifacts caused by a periodic miscalibration of the monochromator; possibly the result of small misperfections in the scanning mechanism the device, not reflection ambiguities.

CDSI A-scans where a mirror was used as the sample are shown in FIG. 5. The scan is displayed on a log scale. The reflection ambiguity was reduced to the noise level in all cases. Scan (a) is using an unattenuated reflection from the surface of the mirror. In scan (b), a 14 dB attenuator was placed in the sample path between the sample and the beam splitter. In scan (c), the sample arm was completely blocked. The sensitivity is measured from the peak signal in scan(a) to the average noise level in scan (c), and was determined to be nearly 100 dB.

Because a scanning monochromator was used together with only a single detector, each scan required about 25 seconds to complete. Thus, stability of the interferometer was very important. The appearance of wings around the signal from the mirror are caused by phase instability of the interferometer because of the slow data acquisition used (20 Hz). Faster data acquisition times would certainly result in smaller wings because phase drift would be minimal during the acquisition. Small sidebands are also visible in some scans. These sidebands are caused by a periodic miscalibration of the monochromator, possibly the result of small imperfections in the scanning mechanism of the device. Even fluctuations of 1% or less can cause significant side bands to appear. By using appropriate calibration procedures, we were able to reduce these sidebands by at least 10 dB and were sometimes able to remove them completely.

Figure 6:
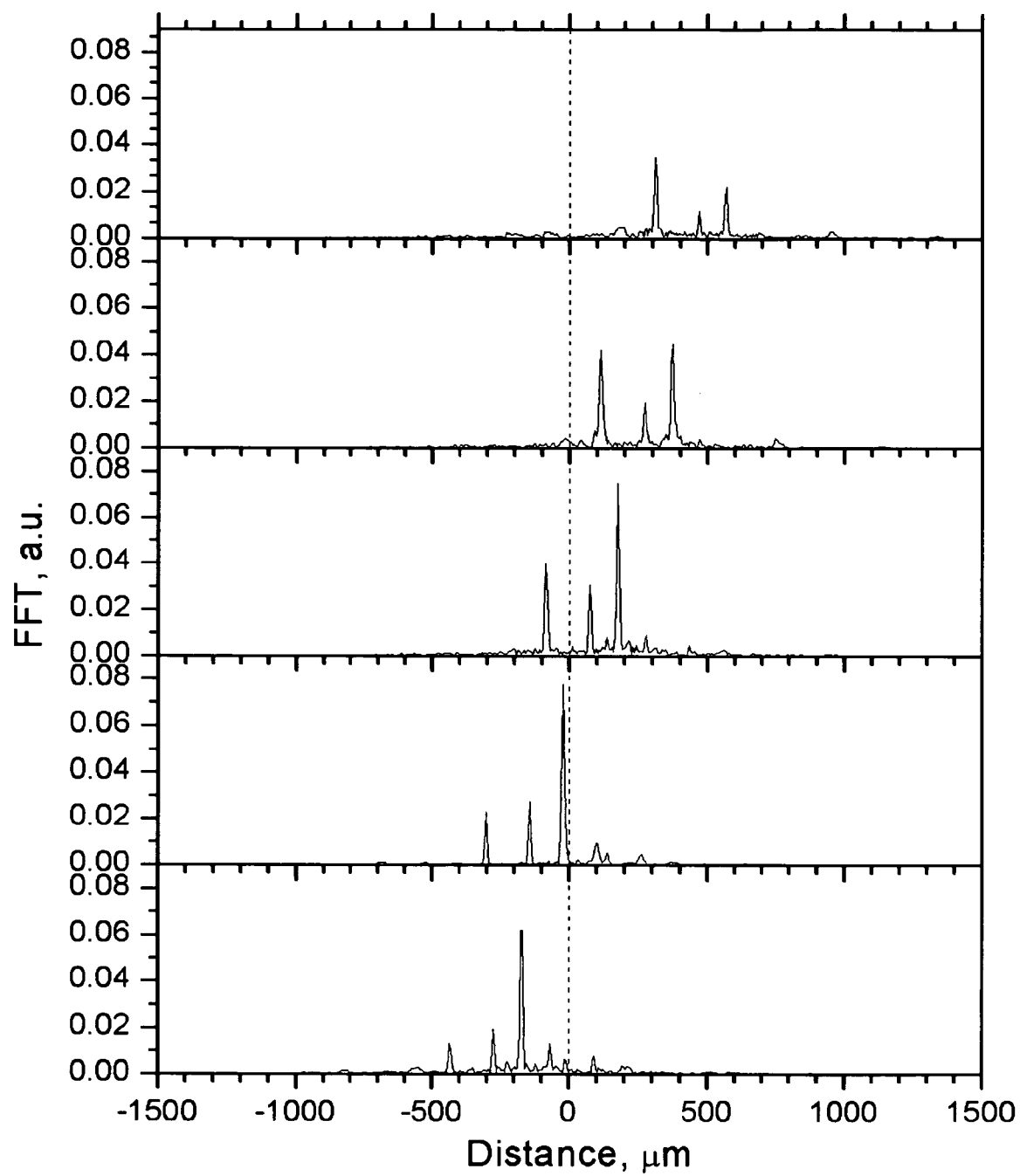
FIG. 6 is a CDSI image of a mirror and cover slide scanned across the middle of the scan range using the invention. The dotted line indicates the zero phase delay plane.
Figure 7:
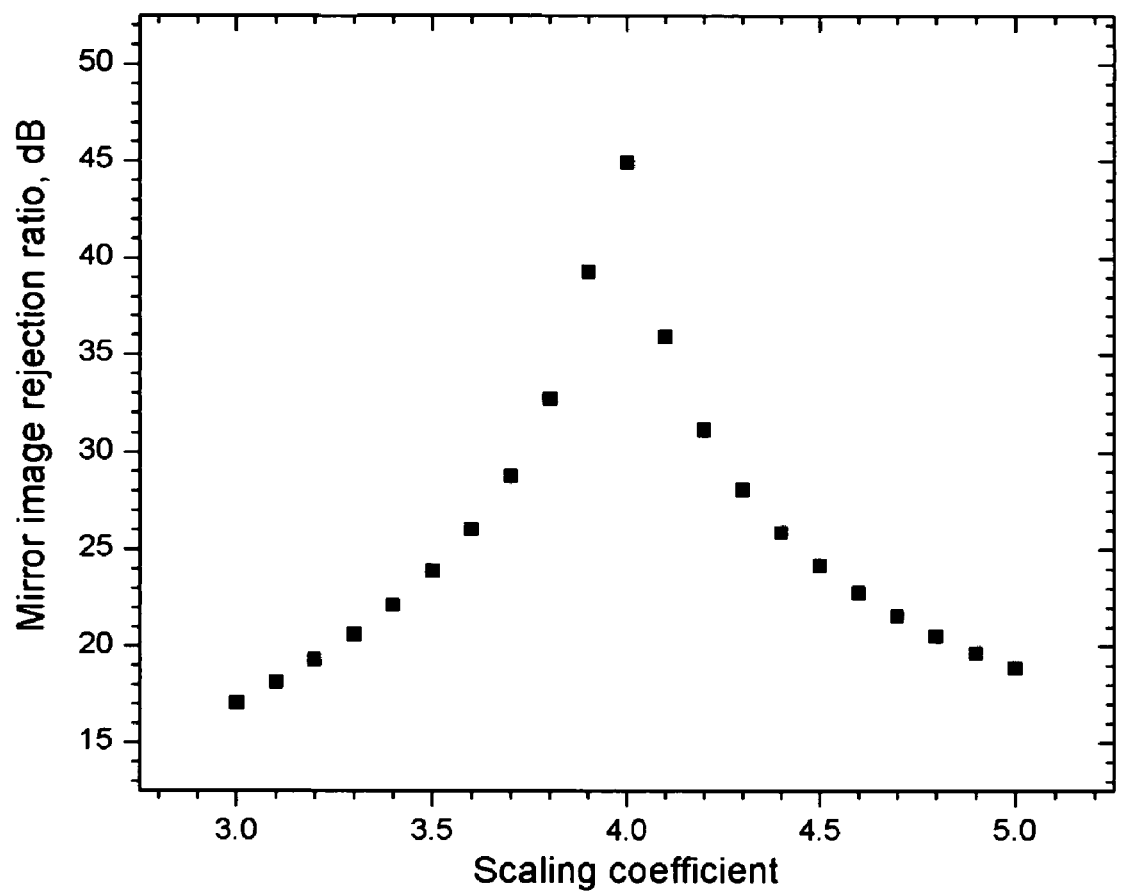
FIG. 7 is a graph of the mirror image (complex conjugate) rejection ratio as a function of the scaling coefficient between the real and imaginary parts; the best value obtained, 45 dB, was noise limited.
Figure 8:
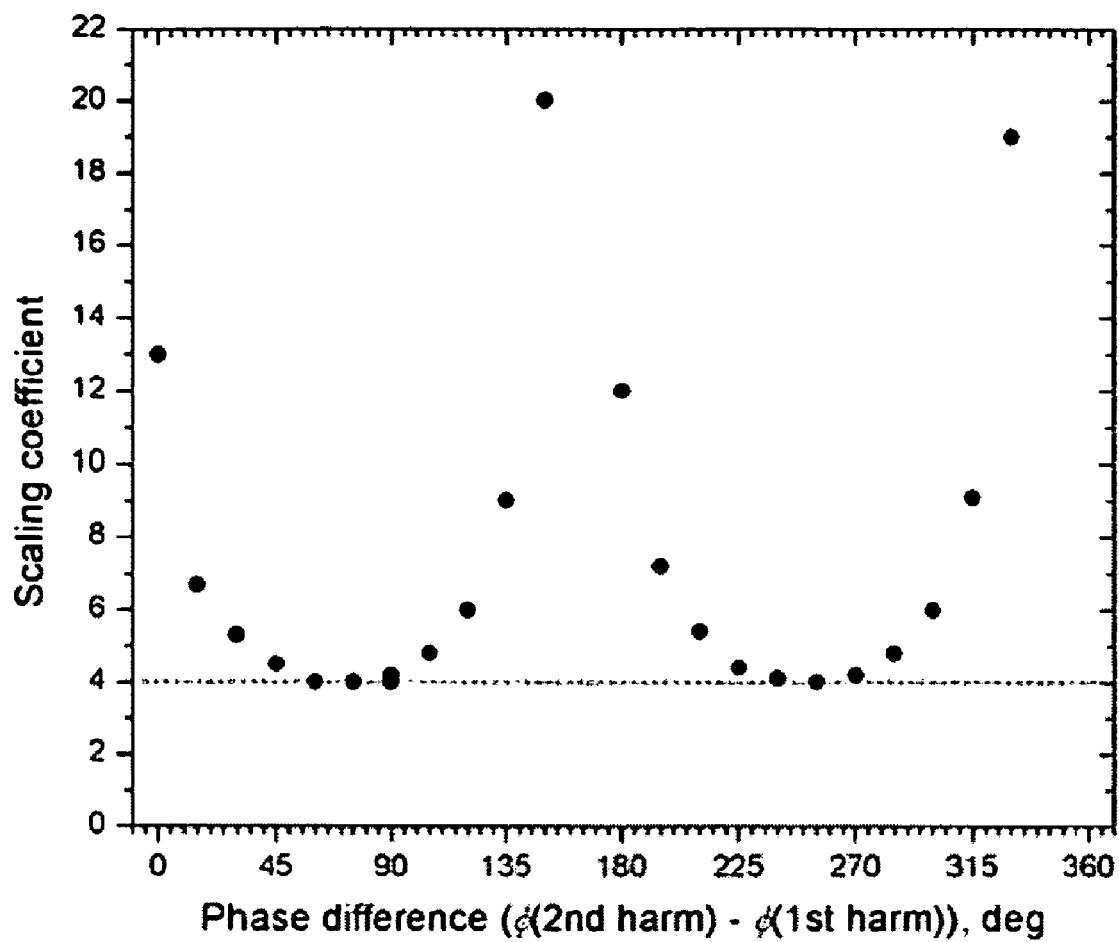
FIG. 8 is a graph showing the scaling coefficient between the real and imaginary parts as a function of phase difference between the first and second harmonics—0 degrees is the expected phase difference—the actual phase shift may vary because of frequency dependent phase shifts in the electronics.

Shown in FIG. 6, is an image of three surfaces as they are moved from positive to negative (right to left). In all cases, the reflection ambiguity is rejected, effectively doubling the scan range. The ratio between the 1 f and 2 f signals that produced perfect rejection of the reflection ambiguity was equal to 4.0, as shown in FIGS. 7 and 8. There is no need to optimize any parameters or post-process the data after the data is taken. All spectra and parameters are obtained exactly by this configuration.

Figure 10:
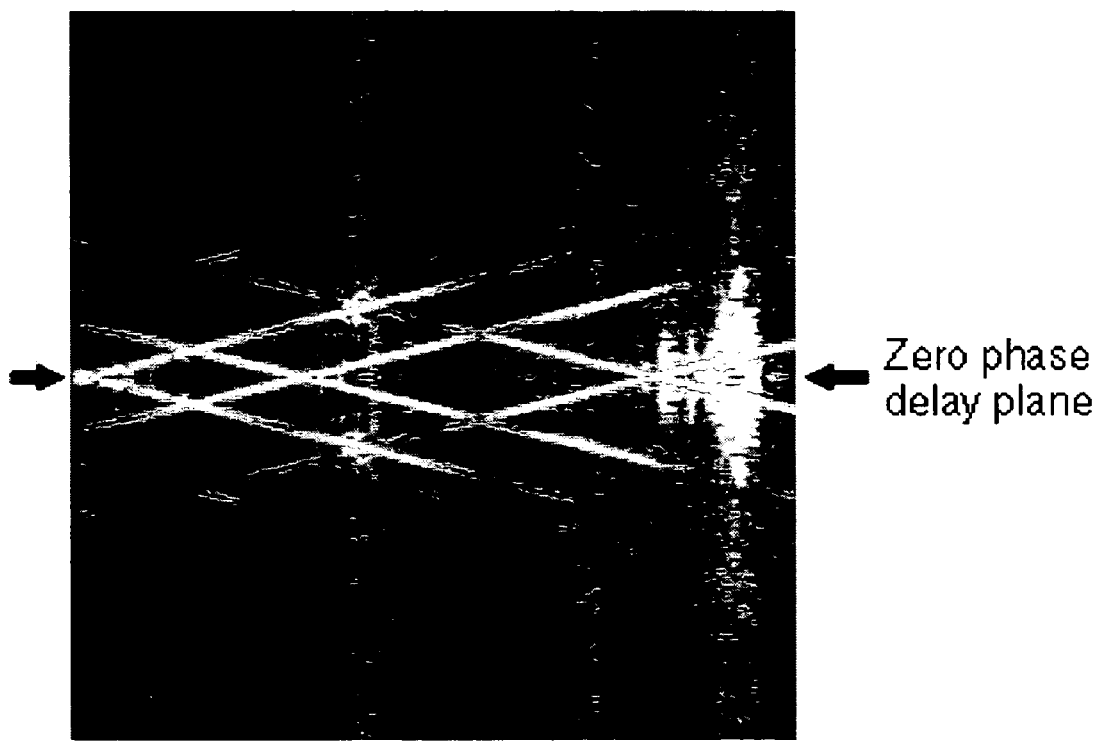
FIG. 10 shows images of a three-surface sample. The top and the bottom panels show images obtained using the real-valued spectral interferogram and the full complex interferogram acquired using the present invention (CDSI), respectively. In the CDSI image, suppression of the DC and complex conjugate artifacts to the noise level is seen.
Figure 10:
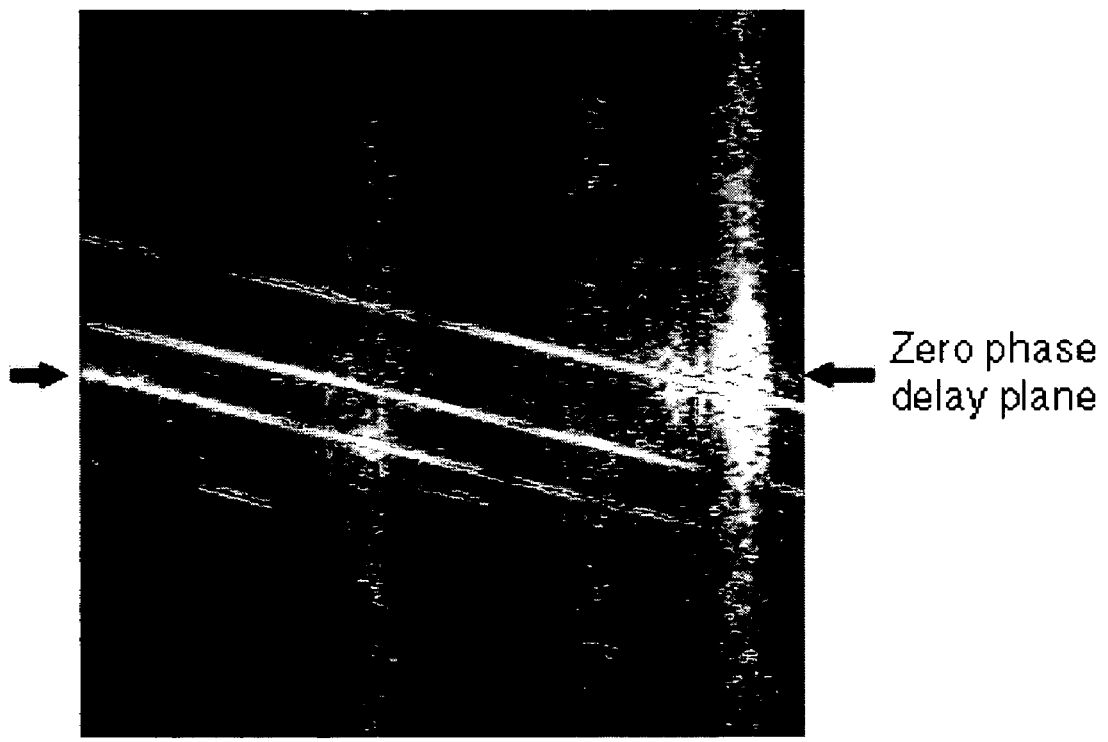

Shown in FIG. 10 are two-dimensional images (B-scans) of a three-surface sample constructed of a mirror and a glass microscope slide. The images are displayed on a log scale. The left and the right panels show images obtained using the real-valued spectral interferogram and the full complex interferogram acquired using the present invention (CDSI), respectively. It is clear that the CDSI image is free from the DC, autocorrelation, and complex conjugate artifacts.

Figure 11:
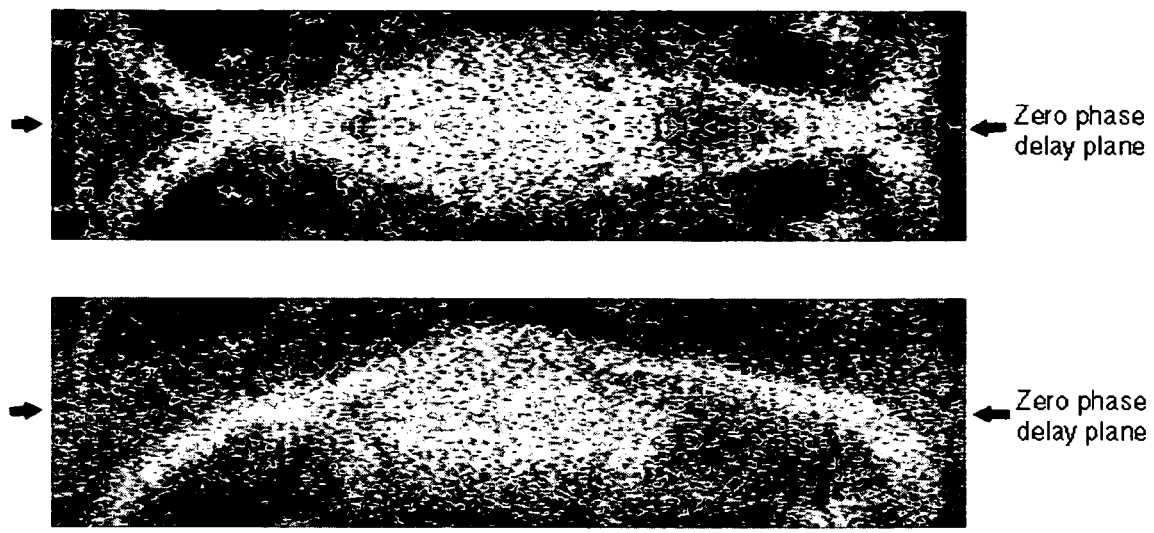
FIG. 11 shows images of a part of a Xenopus Laevis tadpole. The top and the bottom panels show images obtained using the real-valued spectral interferogram and the full complex interferogram acquired using the present invention (CDSI), respectively. In the CDSI image, suppression of the DC and complex conjugate artifacts to the noise level is seen.

Shown in FIG. 11 are two-dimensional images (B-scans) of a part of a Xenopus Laevis tadpole obtained using the present invention. The images are displayed on a log scale. The left and the right panels show images obtained using the real-valued spectral interferogram and the full complex interferogram acquired using the present invention (CDSI), respectively. It is clear that the CDSI image is free from the DC, autocorrelation, and complex conjugate artifacts.

As one can see by the CDSI scans, cutting the depth scan by two is a needless compromise. With CDSI one obtains the full complex interferogram and preserves the positional relationship between all of the scatterers regardless of the placement of the center point of the scan.

EXAMPLE 2

At small modulation amplitudes, the mathematical description of the method resembles that of a technique known as derivative spectroscopy.

When used in wavelength modulation spectroscopy (WMS), the small amplitude limit is often referred to as derivative spectroscopy because the output signals are proportional to the derivatives of the absorption lines. However, we found the output is also proportional to the derivative of the interferogram with respect to phase if the phase of the reference arm is dithered by a small amount and the lock-in is synchronized to this dither. Note that the derivative with respect to phase is different than the derivative with respect to wavelength. The derivative with respect to phase recovers the phase of the interferogram directly while the derivative with respect to wavelength does not. An outline of the derivation appears below.

A spectral domain interferogram with a time dependent phase variation can be written as:

$$I_{SI}(\omega, \phi(\omega)) = I_R(\omega) + I_S(\omega) + \sqrt{I_R(\omega) I_S(\omega)} \cos(\phi_S(\omega) - \phi(\omega)) \quad (8)$$

where $$\phi(\omega) = \phi_0(\omega) + a \cos \omega_m t, \quad (9)$$

$\phi_0(\omega)$ is a constant phase, $\omega$ is the optical frequency of the light, $\omega_m = 2\pi f$ is the modulation frequency, t is time, $I_R(\omega)$ is the intensity of the reference light, $I_S(\omega)$ is the intensity of the sample light, $\phi_S(\omega)$ is the sample phase, and $\phi_R(\omega)$ is the reference phase, and a is the amplitude of the phase modulation.

Assuming G(t) is a time dependent function of $\phi(\omega)$ as defined by Eq. 9, and the amplitude of the phase modulation, $\alpha$, is small, it can be written as a Fourier series:

$$G(\phi(\omega)) = G(\phi_0(\omega) + a\cos\omega_m t) = \sum_{n=0}^{\infty} H_n(\phi_0(\omega))\cos n\omega_m t \quad (10)$$

where $H_n((\phi_0(\omega))$ is given by [Wilson, J. Appl. Phys. 34, p. 3276 (1963)]:

$$H_n(\phi_0(\omega)) = \frac{2^{1-n}}{n!} a^n \frac{d^n I_{SI}(\omega, \phi(\omega))}{d\phi(\omega)^n} \quad (11)$$

Substituting Eq. 8 into Eq. 11, one obtains for $H_1$ and $H_2$:

$$H_1(\phi_0(\omega)) = 2a\sqrt{I_R(\omega)I_S(\omega)} \sin(\varphi_S(\omega) - \varphi_R(\omega) - \phi_0(\omega)),$$

$$H_2(\phi_0(\omega)) = -\frac{1}{2}a^2\sqrt{I_R(\omega)I_S(\omega)} \cos(\varphi_S(\omega) - \varphi_R(\omega) - \phi_0(\omega))$$

Thus, $H_1$ is obtained by demodulating at the first harmonic, f, and $H_2$ is obtained by demodulating at the second harmonic, 2 f. Because Eq. 11 gives the derivatives with respect to phase, $H_1$ and $H_2$ uniquely obtain the phase, and, therefore, the full complex frequency domain interferogram. Because $\alpha$, as defined in Eq. 9, is the amplitude of the phase modulation, it is wavelength dependent; therefore, the ratio $H_1/H_2$ is also wavelength dependent. However, this can easily be corrected a posteriori by simply introducing the appropriate scaling factor.

EXAMPLE 3

The derivation can also be completed without the small phase modulation approximation. Indeed, unlike derivative spectroscopy, the method described here does not require the small phase amplitude approximation, which will become clear during the following derivation. Starting with Eq. 8, one can set:

$$\phi(\tau) = \phi_S(\omega) - \phi_R(\omega)$$

and $$m \cos(\Omega t) = \phi_0(\omega)$$

where $\Omega$ is the modulation frequency ($\omega_m$ previously) of the phase dither, t is the time, and m is the magnitude of the dither (equivalent to $\alpha$ in Eq. 9). Then:

$$G(x+m \cos(\Omega t)) = \cos(\phi_S(\omega) - \phi_R(\omega) - \phi_0(\omega))$$

The Fourier transform of $G(x+m \cos(\Omega t)) = g(y)\exp(imy \cos(\Omega t))$ and using the Jacobi-Anger Expansion:

$$\exp(iz\cos\theta) = J_0(z) + 2\sum_{n=1}^{\infty} i^n J_n(z)\cos(n\theta)$$

given that one sets $x = \phi(T)$ and the Fourier transform variable of x, $y = \Psi(T)$, and g(y)=the Fourier transform $\cos(\phi(T))$, written as $\Im\{\cos \phi(T)\}$, one gets that:

$$g(y)\exp(imy \cos(\Omega t)) = \Im\{\cos(\phi(\tau))\}\exp(im\Psi(T)\cos(\Omega(t)))$$

Using the Jacobi-Anger expansion one obtains:

$$g(y)\exp(imy\cos(\Omega t)) = \Im\{\cos(\varphi(\tau))\}\left(J_0(m\Psi(T)) + 2\sum_{n=1}^{\infty} i^n J_n(m\Psi(T))\cos(n\Omega(t))\right)$$

Using the Fourier transform relationship, one knows that the Fourier transform of the derivative of a function with respect to the Fourier transform variable, x, is equal to the Fourier transform of the original function multiplied by the transform variable, α, multiplied by i:

$$xF(x) = if'_e(\alpha)$$

$$-ixF(x) = f'_e(\alpha)$$

$$(i\alpha)^m f_e(\alpha) = F^{(m)}(x)$$

Thus, $$\mathfrak{I}^{-1}\{\mathfrak{I}\{\cos(\varphi(\tau))\}im\Psi(T)\} = m\frac{d\cos(\varphi(\tau))}{d(\varphi(\tau))} = -m\sin(\varphi(\tau))$$

Bessel functions are defined as:

$$J_m(z) = \sum_{l=0}^{\infty} \frac{(-1)^l}{2^{2l+m}l!(m+l)!}z^{2l+m}$$

$$J_0(z) = \sum_{l=0}^{\infty} (-1)^l \frac{\left(\frac{1}{4}z^2\right)^l}{(l!)^2}$$

Therefore, the Jacobi-Anger expression tells us that the Fourier transform of a phase modulated interferogram can be expanded into a series of harmonics of the phase modulation frequency. Thus, the first harmonic of the interferogram is given by:

$$g(y)\exp(imy\cos(\Omega t))|_{n=1} = 2i\mathfrak{I}\{\cos(\phi(\tau))\}J_1(m\Psi(T))\cos(\Omega(t))$$

and the second harmonic is given by:

$$g(y)\exp(imy\cos(\Omega t))|_{n=2} = 2\mathfrak{I}\{\cos(\phi(\tau))\}J_2(m\Psi(T))\cos(2\Omega(t))$$

Expanding the first harmonic by evaluating the $J_1(Z)$ Bessel function as:

$$J_1(z) = \frac{z}{2} - \frac{z^3}{16} + \frac{z^5}{384} - \ldots$$

one gets:

$$g(y)\exp(imy\cos(\Omega t))|_{n=1} =$$

$$2\mathfrak{I}\{\cos(\varphi(\tau))\}i\left(\frac{m\Psi(T)}{2} - \frac{m^3(\Psi(T))^3}{16} + \frac{m^5(\Psi(T))^5}{384} - \ldots\right)\cos(\Omega(t))$$

Taking the inverse Fourier Transform, one gets:

$$G(x + m\cos(\Omega t))|_{n=1} = 2\cos(\Omega t)\left[\frac{m}{2}\frac{d\cos(\varphi(\tau))}{d(\varphi(\tau))} - \frac{m^3}{16}\frac{d^3\cos(\varphi(\tau))}{d(\varphi(\tau))^3} + \frac{m^5}{384}\frac{d^5\cos(\varphi(\tau))}{d(\varphi(\tau))^5} - \ldots\right]$$

$$= -2\cos(\Omega t)\left[\sin(\varphi(\tau))\left(\frac{m}{2} - \frac{m^3}{16} + \frac{m^5}{384} - \ldots\right)\right]$$

$$= -2\cos(\Omega t)\sin(\varphi(\tau))J_1(m)$$

and for the second harmonic, one gets:

$$G(x + m\cos(\Omega t))|_{n=2} = 2\cos(\Omega t)\left[\frac{m^2}{8}\frac{d^2\cos(\varphi(\tau))}{d(\varphi(\tau))} - \frac{m^4}{96}\frac{d^4\cos(\varphi(\tau))}{d(\varphi(\tau))^4} + \frac{m^6}{3072}\frac{d^6\cos(\varphi(\tau))}{d(\varphi(\tau))^6} - \ldots\right]$$

$$= 2\cos(2\Omega t)\left[\cos(\varphi(\tau))\left(\frac{m^2}{8} - \frac{m^4}{96} + \frac{m^6}{3072} - \ldots\right)\right]$$

$$= 2\cos(2\Omega t)\cos(\varphi(\tau))J_2(m)$$

Thus, the ratio of the first harmonic to the second harmonic is exactly $J_1(m)/J_2(m)$ where m is the magnitude of the modulation. Also, the first harmonic is exactly the sin(φt) term of the interferogram, or the imaginary part, and the second harmonic is exactly the cos(φt) term of the interferogram, or the real part. In practice, it does not really matter which one is assigned the real part and the imaginary part because this constitutes only a rotation in phase by π/2.

From the derivation above, the detection phase of the first harmonic and the second harmonic are the same, although they can vary because of other issues in the system such as variations in frequency response of the electronics.

Figure 9:
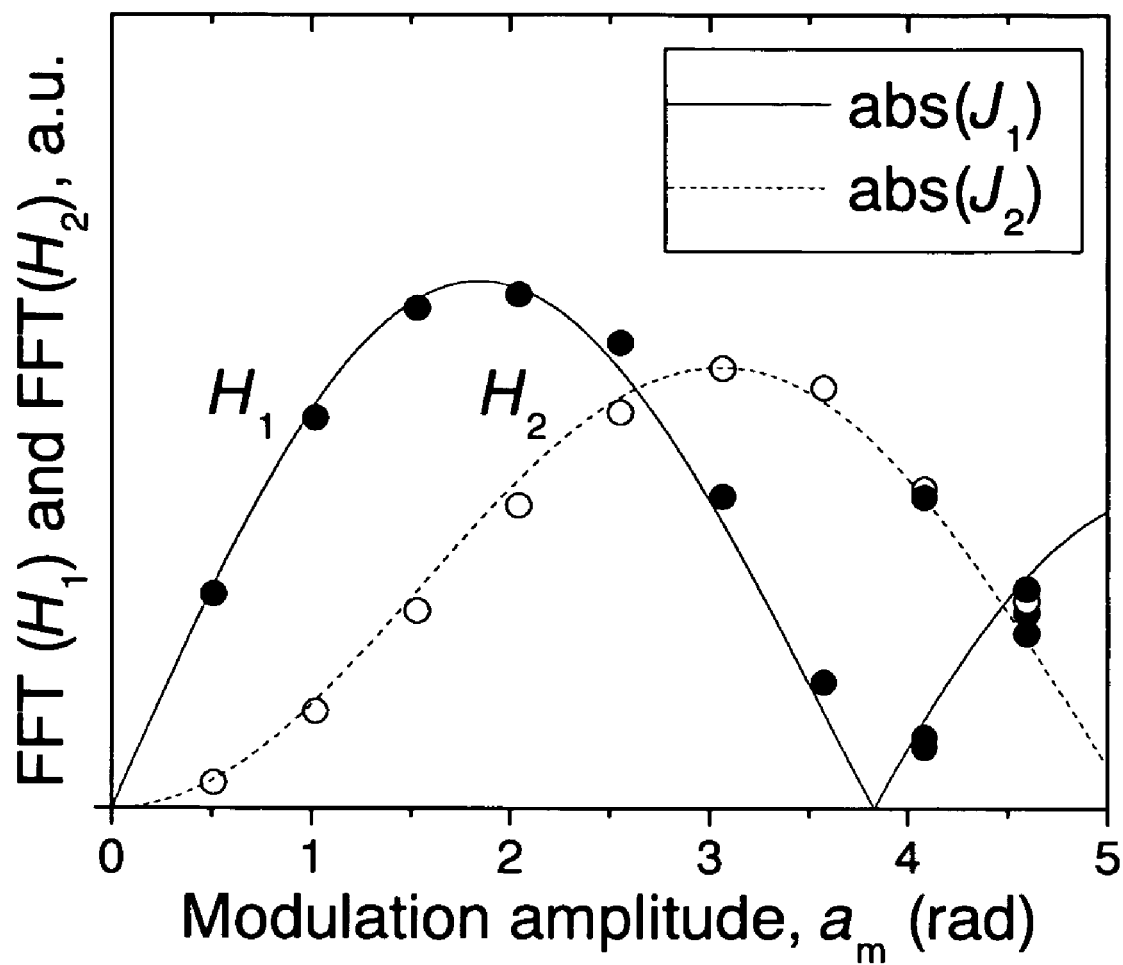
FIG. 9 is a graph showing the experimental dependence of the first- and second-harmonic signals ($H_1$ and $H_2$) on the modulation amplitude (points). The experimental data are well described by the first- and second-order Bessel functions (lines), as predicted by the theory.

FIG. 9 shows experimental dependence of the first- and second-harmonic signals on the modulation amplitude. It is seen that that experimental data are well described by the first- and second-order Bessel functions, as predicted by the theory (see Eq. 6 and derivation in this Example).

EXAMPLE 4

The most important aspect of any method to obtain a complex interferogram is robustness of the data acquisition. That is, slight variations in the scaling between the real part and the imaginary parts should not adversely affect the results and, the acquisition of the real and imaginary parts should not be difficult, requiring exact phase to get the correct answer. Shown in FIGS. 7 and 8 are indications of the robustness of our method. In FIG. 7, the mirror image rejection is shown as a function of the scaling coefficient. The modulation amplitude was 1.00±0.05 The best rejection (~45 dB, noise limited) occurs when the scaling coefficient equals to 4.0, which is very close to the theoretically predicted value 3.8±0.2. The rejection is 5 dB better than the best rejection we were able to obtain using the phase stepping method.

FIG. 8 shows the phase difference between the first and second harmonics for maximum signal. To tweak up the signal, the first and the second harmonic signals were maximized by adjusting the detection phase. The optimum phase for the second harmonic was approximately 75 degrees from the optimum phase value obtained for the first harmonic. However, +/−5 to 10 degrees is easily tolerated.

The preceding examples can be repeated with similar success by substituting the generically or specifically described operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for interferometry, said apparatus comprising:
   an interferometer comprising a light source and an element providing a dithered phase shift between target and reference arms of said interferometer;
   a detector detecting an output from said interferometer; and
   one or more processors receiving input from said detector and demodulating at different multiples of the dither frequency of said element and further processing to create more than one real-valued interferograms, from said demodulations.

2. The apparatus of claim 1 wherein said detector comprises a wavelength-selective device.

3. The apparatus of claim 1 wherein said light source is wavelength-tunable.

4. The apparatus of claim 1 wherein said light source is spectrally broadband.

5. The apparatus of claim 1 wherein two of said multiples of the dither frequency are the first and second harmonics.

6. The apparatus of claim 1 wherein demodulations occur at odd and even harmonics, wherein either the odd harmonic has an order greater than one, or the even harmonic has an order greater than two.

7. The apparatus of claim 1 wherein demodulations occur at odd and even harmonics, wherein the odd harmonic has an order greater than one, and the even harmonic has an order greater than two.

8. The apparatus of claim 1 wherein all demodulations occur at either odd or even harmonics.

9. The apparatus of claim 1 wherein said real-valued interferograms represent the real and imaginary components of a complex spectral interferogram.

10. The apparatus of claim 9 wherein said real and imaginary components of the complex spectral interferogram are used to obtain the complex spectral interferogram.

11. The apparatus of claim 1 wherein said dithered phase shift is a modulation using an arbitrary waveform.

12. A method for interferometry, the method comprising the steps of:
    providing an interferometer comprising a light source;
    employing an element to provide a dithered phase shift between target and reference arms of the interferometer;
    detecting output from the interferometer;
    demodulating signals received from the detector at different multiples of the dither frequency; and
    generating more than one real-valued differential interferograms from the demodulations.

13. The method of claim 12 wherein the detecting step employs a wavelength-selective device.

14. The method of claim 12 wherein the light source is wavelength-tunable.

15. The method of claim 12 wherein the light source is spectrally broadband.

16. The method of claim 12 wherein two of the multiples of the dither frequency are the first and second harmonics.

17. The method of claim 12 wherein demodulations occur at odd and even harmonics, wherein either the odd harmonic has an order greater than one, or the even harmonic has an order greater than two.

18. The method of claim 12 wherein demodulations occur at odd and even harmonics, wherein the odd harmonic has an order greater than one, and the even harmonic has an order greater than two.

19. The method of claim 12 wherein all demodulations occur at either odd or even harmonics.

20. The method of claim 12 wherein the real-valued interferograms represent the real and imaginary components of a complex spectral interferogram.

21. The method of claim 20 wherein said real and imaginary components of the complex spectral interferogram are used to obtain the complex spectral interferogram.

22. The method of claim 12 wherein the dithered phase shift is a modulation using an arbitrary waveform.

23. An apparatus for interferometry, said apparatus comprising:
    an interferometer comprising a light source and an element providing a modulated relative phase shift between target and reference arms of said interferometer;
    a detector detecting an output from said interferometer; and
    one or more processors receiving input from said detector and demodulating at different multiples of the modulation frequency of said element and further processing to create more than one real-valued interferograms.

24. A method for interferometry, the method comprising the steps of:
    providing an interferometer comprising a light source;
    employing an element to provide a modulated relative phase shift between target and reference arms of the interferometer;
    detecting output from the interferometer;
    demodulating signals received from the detector at different multiples of the modulation frequency; and
    generating more than one real-valued interferograms from the demodulations.

25. An apparatus for interferometry, said apparatus comprising:
    an interferometer comprising a light source and an element providing a relative phase shift between target and reference arms of said interferometer modulated at multiple frequencies;
    a detector detecting an output from said interferometer; and
    one or more processors receiving input from said detector and demodulating at different multiples of the modulation frequencies of said element and further processing to create more than one real-valued interferograms.

26. A method for interferometry, the method comprising the steps of:
    providing an interferometer comprising a light source;
    employing an element to provide a relative phase shift between target and reference arms of the interferometer modulated at multiple frequencies;
    detecting output from the interferometer;
    demodulating signals received from the detector at different multiples of the modulation frequencies; and
    generating more than one real-valued interferograms from the demodulations.

* * * * *

UNITED STATES PATENT AND TRADEMARK OFFICE
CERTIFICATE OF CORRECTION

PATENT NO. : 7,394,546 B2  
APPLICATION NO. : 11/438864  
DATED : July 1, 2008  
INVENTOR(S) : Daniel J. Kane, Andrei B. Vakhtin and Kristen A. Peterson Page 1 of 3

It is certified that error appears in the above-identified patent and that said Letters Patent is hereby corrected as shown below:

Column 2, line 65, delete "form" and substitute --from--

Column 4, line 59, delete "at"

Column 8, line 16, delete

" $$H_2(\omega, \phi_0(\omega)) = -4J_2(a_m(\omega))\sqrt{I_R(\omega)) I_S(\omega)} \times \cos(\phi_S(\phi_S(\omega) - (\omega) - \phi_0(\omega)) \quad (4)$$ ", and substitute -- $$H_2(\omega, \phi_0(\omega)) = -4J_2(a_m(\omega))\sqrt{I_R(\omega) I_S(\omega)} \times \cos(\phi_S(\omega) - \phi_R(\omega) - \phi_0(\omega)) \quad (4)$$ --

Column 11, line 45, delete " $$I_{SI}(\omega, \phi(\omega)) = I_R(\omega) + I_S(\omega) + \sqrt{I_R(\omega) I_S(\omega)} \cos(\phi_S(\omega) - \phi(\omega)) \quad (8)$$ "

and substitute

-- $$I_{SI}(\omega, \phi(\omega)) = I_R(\omega) + I_S(\omega) + \sqrt{I_R(\omega) I_S(\omega)} \cos(\varphi_S(\omega) - \varphi_R(\omega) - \phi(\omega)) \quad (8)$$ --

Column 11, line 49, delete

" $$\phi(\omega) = \phi_0(\omega) + a \cos \omega_m t, \quad (9)$$ "

and substitute

-- $$\phi(\omega) = \phi_0(\omega) + a \cos \omega_m t, \quad (9)$$ --

UNITED STATES PATENT AND TRADEMARK OFFICE
CERTIFICATE OF CORRECTION

PATENT NO.       : 7,394,546 B2                                              Page 2 of 3
APPLICATION NO.  : 11/438864
DATED            : July 1, 2008
INVENTOR(S)      : Daniel J. Kane, Andrei B. Vakhtin and Kristen A. Peterson It is certified that error appears in the above-identified patent and that said Letters Patent is hereby corrected as shown below:

Column 12, line 9, delete

"$$H_1(\phi_0(\omega)) = 2a\sqrt{I_R(\omega)I_S(\omega)}\sin(\varphi_S(\omega) - \varphi_R(\omega) - \phi_0(\omega)),$$"

and substitute

-- $$H_1(\phi_0(\omega)) = 2a\sqrt{I_R(\omega)I_S(\omega)}\sin(\phi_S(\omega) - \phi_R(\omega) - \phi_0(\omega)),$$ --

Column 12, line 11, delete

"$$H_2(\phi_0(\omega)) = -\frac{1}{2}a^2\sqrt{I_R(\omega)I_S(\omega)}\cos(\varphi_S(\omega) - \varphi_R(\omega) - \phi_0(\omega))$$"

and substitute

-- $$H_2(\phi_0(\omega)) = -\frac{1}{2}a^2\sqrt{I_R(\omega)I_S(\omega)}\cos(\phi_S(\omega) - \phi_R(\omega) - \phi_0(\omega))$$ --

Column 12, line 17, delete "α", and substitute an italicized --a--

Column 12, line 41, delete "α", and substitute an italicized --a--

UNITED STATES PATENT AND TRADEMARK OFFICE
CERTIFICATE OF CORRECTION

PATENT NO. : 7,394,546 B2
APPLICATION NO. : 11/438864
DATED : July 1, 2008
INVENTOR(S) : Daniel J. Kane, Andrei B. Vakhtin and Kristen A. Peterson It is certified that error appears in the above-identified patent and that said Letters Patent is hereby corrected as shown below:

Column 13, line 36, delete

" $g(y)\exp(imy\cos(\Omega t))|_{n=2} - 2\Im\{\cos(\phi(\tau))\}J_2(m\Psi(T))\cos(2\Omega(t))$ "

and substitute

-- $g(y)\exp(imy\cos(\Omega t))|_{n=1} = 2i\Im\{\cos(\phi(\tau))\}J_1(m\Psi(T))\cos(\Omega(t))$ --

Signed and Sealed this

Thirtieth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,394,546 B2 Page 1 of 1
APPLICATION NO. : 11/438864
DATED : July 1, 2008
INVENTOR(S) : Daniel J. Kane, Andrei B. Vakhtin and Kristen A. Peterson It is certified that error appears in the above-identified patent and that said Letters Patent is hereby corrected as shown below:

In the Specification:
Column 1, lines 29 and 30, delete "Contract No. DMI-0214911 awarded by the U.S. National Science Foundation" and substitute --Contract No. R42HL079781 and Contract No. R44HL079781 awarded by the National Institutes of Health--

Signed and Sealed this

Twentieth Day of July, 2010

David J. Kappos
*Director of the United States Patent and Trademark Office*